(12) United States Patent
Vishnu (10) Patent No.: US 12,039,450 B2
(45) Date of Patent: Jul. 16, 2024

(54) ADAPTIVE BATCH REUSE ON DEEP MEMORIES

(71) Applicant: ADVANCED MICRO DEVICES, INC., Santa Clara, CA (US)

(72) Inventor: Abhinav Vishnu, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 1269 days.

(21) Appl. No.: 16/424,115

(22) Filed: May 28, 2019

(65) Prior Publication Data
US 2020/0151510 A1    May 14, 2020

Related U.S. Application Data

(60) Provisional application No. 62/758,826, filed on Nov. 12, 2018.

(51) Int. Cl.
| | | |
|---|---|---|
| *G06N 3/084* | (2023.01) | |
| *G06F 9/38* | (2018.01) | |
| *G06F 18/21* | (2023.01) | |
| *G06F 18/2115* | (2023.01) | |
| *G06F 18/214* | (2023.01) | |
| *G06N 3/08* | (2023.01) | |

(52) U.S. Cl.
CPC .......... *G06N 3/084* (2013.01); *G06F 9/3877* (2013.01); *G06F 18/2115* (2023.01); *G06F 18/2148* (2023.01); *G06F 18/217* (2023.01); *G06N 3/08* (2013.01)

(58) Field of Classification Search
CPC .. G06K 9/6257; G06K 9/6231; G06K 9/6262; G06F 9/3877; G06N 3/08
See application file for complete search history.

(56) References Cited

U.S. PATENT DOCUMENTS

| | | | |
|---|---|---|---|
| 9,990,687 B1* | 6/2018 | Kaufhold | G06V 10/454 |
| 10,891,156 B1* | 1/2021 | Zhao | G06F 9/4881 |
| 2009/0055594 A1* | 2/2009 | Berg | G06F 11/3466 |
| | | | 711/E12.071 |
| 2017/0103161 A1* | 4/2017 | Brubaker | G16B 15/00 |
| 2017/0308789 A1* | 10/2017 | Langford | G06N 3/045 |
| 2018/0067961 A1* | 3/2018 | Yang | G06F 16/188 |
| 2019/0114537 A1* | 4/2019 | Wesolowski | G06N 3/105 |
| 2019/0114547 A1* | 4/2019 | Jaganathan | G16B 20/00 |
| 2019/0156157 A1* | 5/2019 | Saito | G06F 18/217 |
| 2020/0302334 A1* | 9/2020 | Yang | G06N 20/00 |
| 2020/0372337 A1* | 11/2020 | Ebrahimi | G06N 3/084 |

FOREIGN PATENT DOCUMENTS

| | | | | |
|---|---|---|---|---|
| JP | 2021119425 A | * | 3/2018 | ............ G06N 20/00 |
| WO | WO-2018174873 A1 | * | 9/2018 | ......... G06F 21/6245 |

* cited by examiner

*Primary Examiner* — Qun Shen (57) ABSTRACT

A method of adaptive batch reuse includes prefetching, from a CPU to a GPU, a first plurality of mini-batches comprising a subset of a training dataset. The GPU trains the neural network for the current epoch by reusing, without discard, the first plurality of mini-batches in training the neural network for the current epoch based on a reuse count value. The GPU also runs a validation set to identify a validation error for the current epoch. If the validation error for the current epoch is less than a validation error of a previous epoch, the reuse count value is incremented for a next epoch. However, if the validation error for the current epoch is greater than a validation error of a previous epoch, the reuse count value is decremented for the next epoch.

20 Claims, 4 Drawing Sheets

ADAPTIVE BATCH REUSE ON DEEP MEMORIES

CROSS-REFERENCE TO RELATED APPLICATION

The present application claims priority to U.S. Provisional Patent Application No. 62/758,826, entitled "ADAPTIVE BATCH REUSE ON DEEP MEMORIES TO IMPROVE PERFORMANCE AND DATA MOVEMENT AND ENERGY CONSUMPTION", and filed on Nov. 12, 2018, the entirety of which is incorporated by reference herein.

BACKGROUND

Deep learning is part of a broader family of machine learning methods based on learning data representations, as opposed to task-specific algorithms. Deep learning architectures such as neural networks are computational systems based on neural network architecture, and are utilized in a variety of applications including, for example, document search, time series analysis, medical image diagnosis, character, speech, and image recognition, and data mining.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Large datasets are used in various deep learning (DL) and machine learning (ML) applications. In contrast to batch gradient descent, which derives the direction and magnitude with which to update the weights of a neural network model from the full dataset, mini-batch learning involves deriving model updates from only a subset of the training dataset at a time. A popular variant is called stochastic gradient descent and involves training on only a single sample at a time. When using Graphics Processing Units (GPUs), a mini-batch is pipelined from the Central Processing Unit (CPU), used for feed-forward and back-propagation, and then discarded until the end of an epoch (e.g., one full training cycle on the training dataset). This leads to significant data movement between the CPU and GPU. However, in various computing systems, the bandwidth of communications buses that connect the CPU and GPU have not kept up with speed of increases in GPU processing capabilities, such that the speed at which a GPU can train a neural network is limited by the bandwidth of the communications bus.

Accordingly, FIGS. 1-4 illustrate techniques for improving system performance by conducting reuse of mini-batches and reducing CPU-to-GPU communication to address the increasing gap between GPU compute capability and communications bus bandwidth. In some embodiments, a method of adaptive batch reuse includes prefetching, from a CPU to a GPU, a first plurality of mini-batches comprising a subset of a training dataset. The GPU trains the neural network for the current epoch by reusing, without discard, the first plurality of mini-batches in training the neural network for the current epoch based on a reuse count value representing a number of times mini-batches are reused before discarding. The GPU also runs a validation set to identify a validation error for the current epoch. If the validation error for the current epoch is less than a validation error of a previous epoch, the reuse count value is incremented for a next epoch. However, if the validation error for the current epoch is greater than a validation error of a previous epoch, the reuse count value is decremented for a next epoch. In other embodiments, rather than incrementing or decrementing the reuse count value based on comparison to the validation error of a previous epoch, the GPU changes reuse count values based on comparison to a predetermined validation error threshold (e.g., any arbitrary increase/decrease in error or any validation error value).

Figure 1:
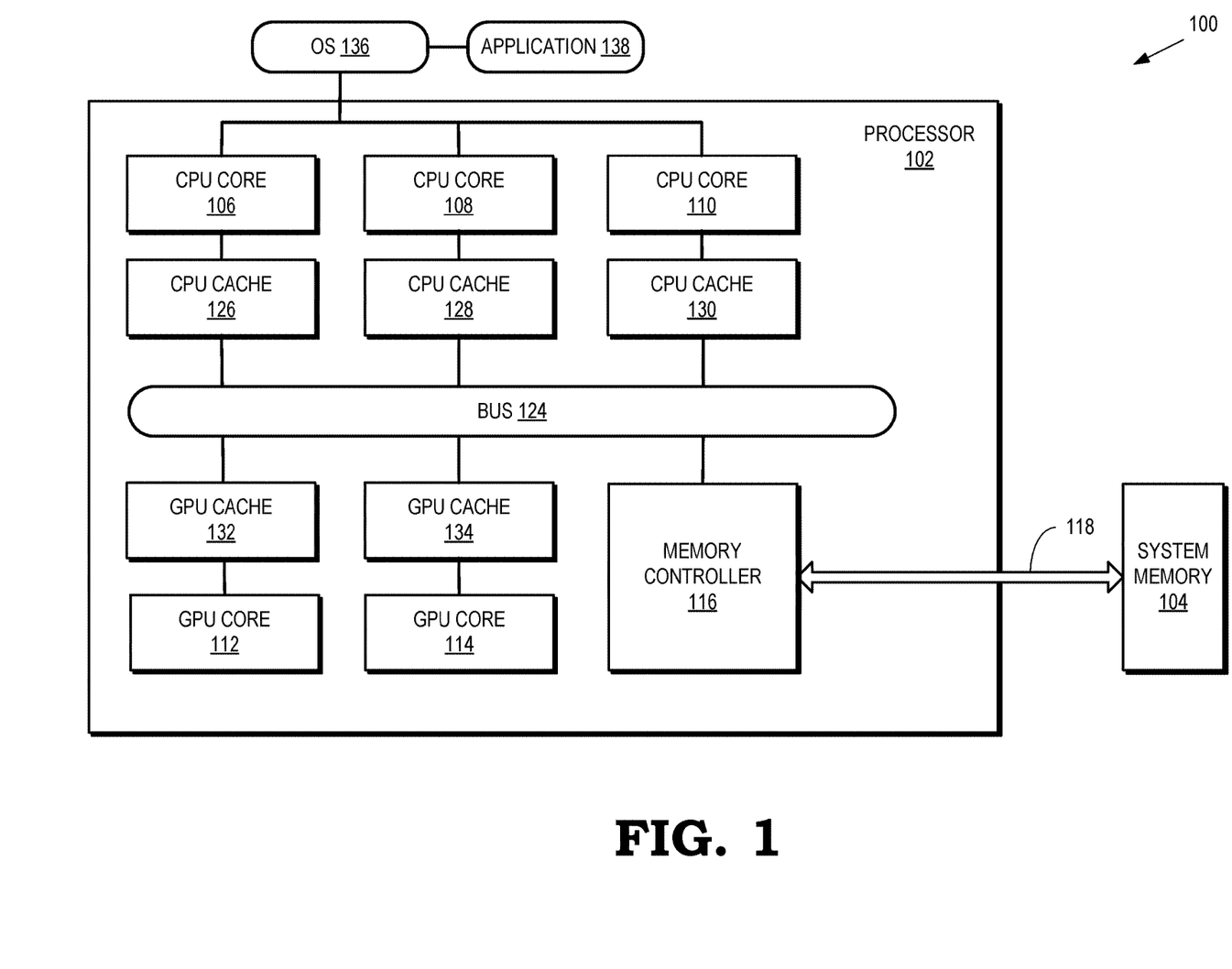
FIG. 1 is a block diagram of a processing system for employing adaptive batch reuse in accordance with some embodiments.

FIG. 1 is a block diagram of a processing system 100 for employing adaptive batch reuse in accordance with some embodiments. The processing system 100 includes a processor 102 that is connected to a system memory 104, such as a dynamic random access memory (DRAM). The processor 102 includes a plurality of compute units 106, 108, 110, 112, 114 (collectively referred to as the "compute units 106-114") such as central processing unit (CPU) cores 106, 108, 110 and graphics processing unit (GPU) cores 112, 114. Each of the compute units 106-114 includes one or more processor cores that concurrently process different instructions. The compute units 106-114 also include one or more resources that are shared by the processor cores, such as caches, arithmetic logic units, floating-point units, branch prediction logic, memory or bus interfaces, and the like.

The processor 102 may be implemented as a single integrated circuit, or as a combination of multiple integrated circuits. For example, the processor 102 can be fabricated as a system-on-a-chip (SoC) such as an accelerated processing unit (APU) or accelerated processing device (APD) that is formed on a substrate. To illustrate, the processor 102 (and the functional units formed thereon) may form part of one semiconductor die, while the system memory 104 forms part of a different semiconductor die. In other embodiments, CPU cores and GPU cores may be formed on different dies. Although illustrated in FIG. 1 in the context of a heterogeneous processing system with a heterogeneous CPU-GPU (i.e., processor 102), it should be recognized that the batch reuse processes described herein may be employed in various other processing systems (such as the processing system 200 of FIG. 2) without departing from the scope of the present disclosure.

The processor 102 is associated with corresponding memory elements, which may be internal to (e.g., implemented on) the processor 102 or external to the processor 102 (e.g., system memory 104). For example, the processor 102 is connected to the external system memory 104. The processor 102 includes a memory controller (MC) 116 that coordinates the flow of data between the processor 102 and the system memory 104 over a memory interface 118. The memory controller 116 includes logic used to control reading information from the system memory 104 and writing information to the system memory 104. In other embodiments, the processor 102 is associated with other different types of internal or external memory elements.

The compute units 106-114 communicate with each other, with the memory controller 116, or with other entities in the processing system 100 using a bus 124. For example, the compute units 106-114 can include a physical layer interface or bus interface for asserting signals onto the bus 124 and receiving signals from the bus 124 that are addressed to the corresponding compute unit 106-114. Some embodiments of the processor 102 also include one or more interface blocks or bridges such as a northbridge or a southbridge for facilitating communication between entities in the processor 102. In some embodiments, the bus 124 includes a coherent data fabric that interconnects the compute units 106-114.

The processor 102 includes one or more levels of cache associated with each of the compute units 106-114. Caches 126, 128, 130, 132, 134 (i.e., CPU caches 126, 128, 130 and GPU caches 132, 134; collectively referred to herein as "the caches 126-134") are used to store (i.e., cache) copies of information stored in the memory 104. Memory transactions for the CPU or GPU cores are then satisfied using the cached copy of the information instead of performing the memory transaction directly on the information stored in the memory 104. The blocks used to represent the caches 126-134 may represent a single cache or a plurality of caches such as a cache hierarchy. For example, in one embodiment, the cache 126 represents a cache hierarchy including multiple cache levels such as an L1 cache, an L2 cache, or an L3 cache. In at least one embodiment, each of the caches 126-134 includes a set of entries, each entry storing an associated unit of data referred to as a cache line. The processor 102 executes an operating system (OS) 136. Although a single instance of the OS 136 is shown in FIG. 1, some embodiments of the processor 102 execute multiple instantiations of the operating system or one or more applications. The processor 102 also executes an application 138 that generates work in the processor 102.

In various embodiments, the processing system 100 performs training for machine learning (ML) models. Machine learning models typically include parameters (e.g., weights) and one or more cost functions to evaluate how well a particular set of parameters performs. Many machine learning problems reduce to finding a set of weights for the model which minimizes the cost function. For example, in some embodiments, the processing system 100 utilizes optimization algorithms based on gradient descent for determining parameters of machine learning algorithms, such as artificial neural networks and logistic regression. In gradient descent, the term "batch" refers to the total number of examples in a data set used to calculate the gradient in a single iteration.

Mini-batch gradient descent is a variation of gradient descent that splits the training data set into small batches that are used to calculate model error and update model weights. Implementations may sum the gradient over the mini-batch or take the average of the gradient which further reduces the variance of the gradient. Mini-batch gradient descent seeks to find a balance between the robustness of stochastic gradient descent (e.g., using only a single instance of the data set for a batch size of 1) and the efficiency of batch gradient descent. Mini-batch gradient descent is the most common implementation of gradient descent in the field of deep learning.

In various deep learning and machine learning applications, the CPU cores 106-110 generally perform considerably fewer computations relative to GPU cores 112-114. Instead, the CPU cores 106-110 execute CPU functions such as initiating GPU function calls and loading mini-batches. In contrast to the techniques described herein, a conventional training process includes asynchronously pipelining mini-batches from the CPU to the GPU and discarding each mini-batch after processing (e.g., after training a neural network once with the mini-batch at the GPU) until every other mini-batch has been processed. This approach requires a relatively high number of data fetches and communications bandwidth usage. For example, a mini-batch (after being fetched from the CPU to the GPU) is discarded after finishing one pass through the neural network and the CPU transfers another mini-batch to the GPU. This data movement between the GPU and GPU consumes processor resources, including power.

Accordingly, in various embodiments, the GPU cores 112-114 adaptively reuse mini-batches by training a neural network multiple times with the same mini-batch before discarding. In particular, the CPU cores 106-110 asynchronously pipeline mini-batches from the CPU cores 106-100 to the GPU cores 112-114 via the bus 124 during the feedforward step. However, by re-using mini-batches multiple times before discarding as described herein, data movement is reduced, energy associated with data movement is reduced, and processor performance is improved.

Figure 2:
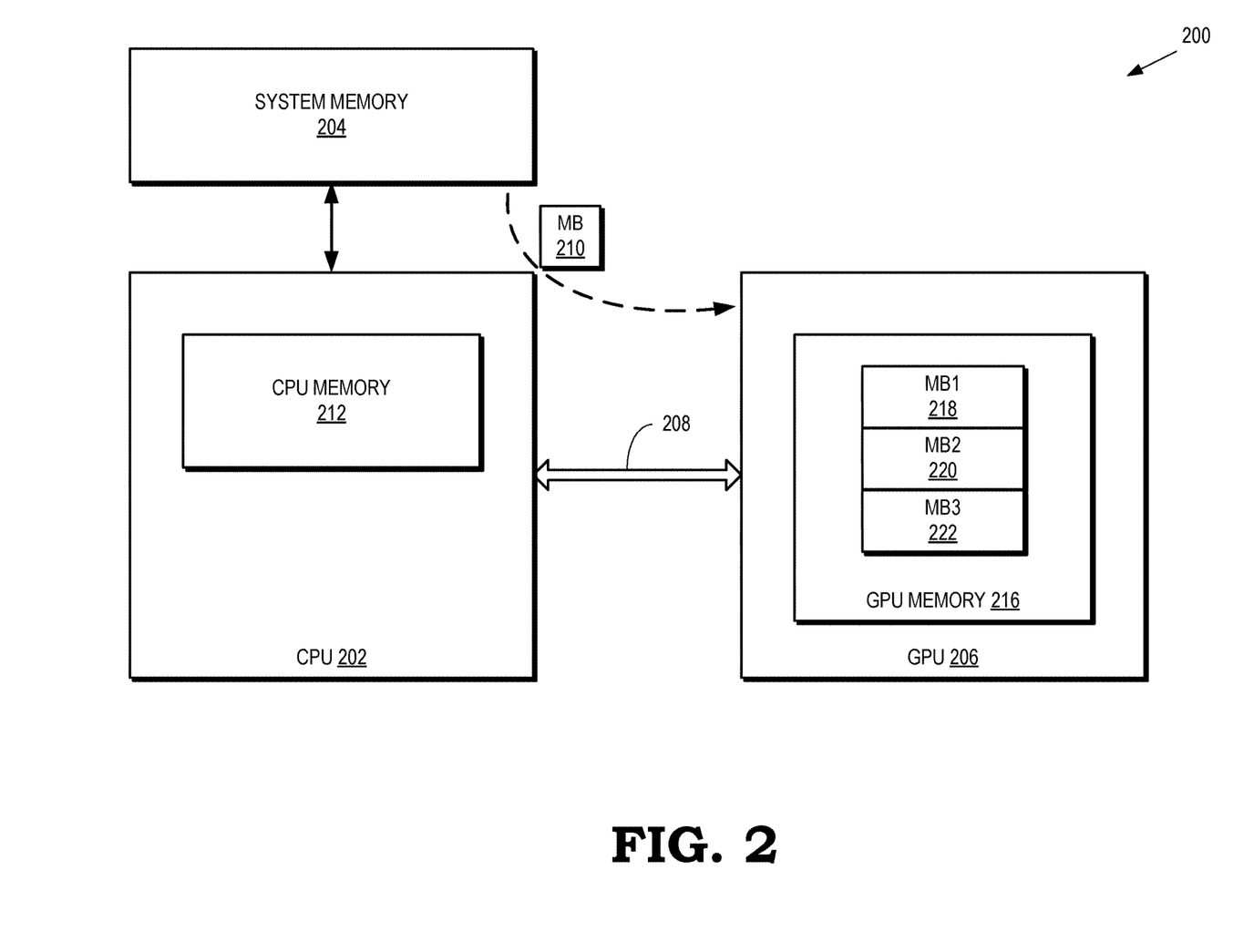
FIG. 2 is a block diagram of another processing system for employing adaptive batch reuse in accordance with some embodiments.

To illustrate, FIG. 2 is a block diagram of another processing system 200 for employing adaptive batch reuse in accordance with some embodiments. The processing system 200 includes a central processing unit (CPU) 202 that is connected to a system memory 204, such as a dynamic random access memory (DRAM). In various embodiments, the CPU 202 includes a plurality of CPU cores (not shown). The CPU 202 may be implemented as a single integrated circuit, or as a combination of multiple integrated circuits. The CPU 202 is communicably coupled to a graphics processing unit (GPU) 206 via an input/output (I/O) bus 208.

In various embodiments, the processing system 200 trains a neural network (not shown for ease of illustration) having a plurality of layers, each layer including one or more feature detectors. Further, each layer of the neural network is associated with activation functions and weights for each parameter input to its respective feature detector. Generally, the output of a feature detector of a layer i may be provided as input to one or more feature detectors of a layer i+1. The neural network is implemented by one or more processors (e.g., GPU cores 112-114 of FIG. 1). Each feature detector may be considered as a processing node of the neural network and one or more nodes may be implemented by a processor. Further, it will be understood that each feature detector may be associated with a hidden unit or an input unit of the neural network for a hidden layer or an input layer, respectively.

Though the neural network is described herein in the context of a feedforward neural network, those skilled in the art will recognize that the type of neural network implemented is not limited merely to feedforward neural networks but can also be applied to any neural networks, including convolutional neural networks (CNNs), recurrent neural networks (RNNs), auto-encoders and the like. Further, in various embodiments, the neural networks include linear regression models, logistic regression models, neural network models with at least one layer of hidden units, or a combination thereof.

The system memory 204 stores activations and learned weights for each feature detector. The system memory 204 further stores a training set including training data. In some embodiments, the training data includes, for example, images with known classifications for image classification training. Additionally, the system memory 204 further stores a validation set including validation data.

During the training stage, the neural network optimizes weights for each feature detector. The CPU 202 pipelines training samples (e.g., mini-batches) from CPU memory 212 to GPU memory 216. After learning, the optimized weight configuration can then be applied to test data. As illustrated, the CPU 202 transfers one or more mini-batches 210 of training samples. In some embodiments, the GPU memory 216 includes high bandwidth memory (HBM) at the GPU 206 or one or more levels of a cache hierarchy. Those skilled in the art will recognize that training datasets are increasingly larger in size and that entire datasets may often not be simultaneously stored at the GPU memory 216 in its entirety. Accordingly, the CPU 202 typically asynchronously pipelines training data from the CPU memory 212 (and originating from the system memory 204) to the GPU memory 216 during the feedforward step of neural network training. As illustrated in FIG. 2, the GPU memory 216 stores a plurality of mini-batches (such as MB1 218, MB2 220, and MB3 222) for latency hiding such that after a first mini-batch (e.g., MB1 218) is processed, the GPU 206 proceeds with processing of a second mini-batch (e.g., MB2 220) without needing to wait for the CPU 202 to transfer data.

Figure 3:
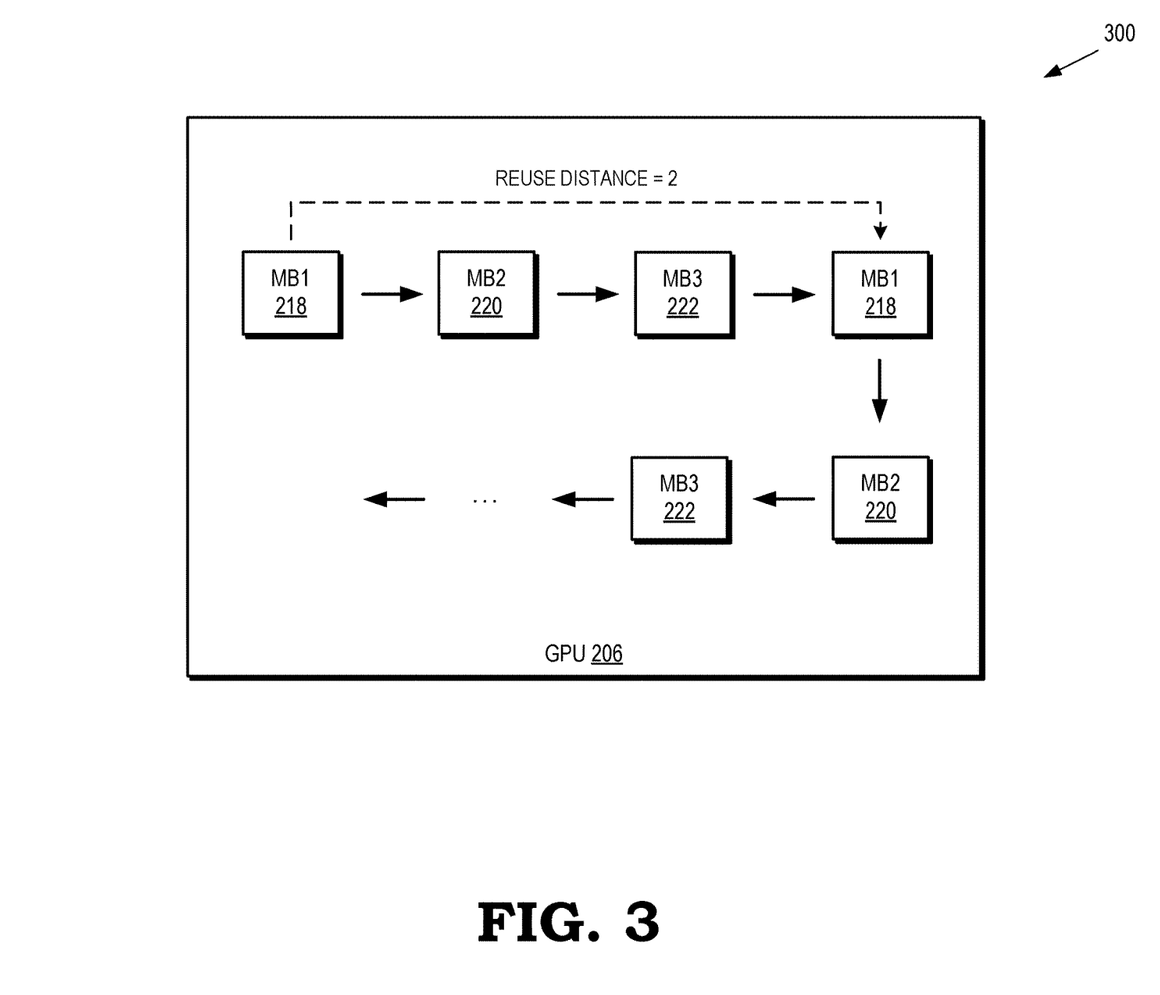
FIG. 3 is a diagram of mini-batch reuse in accordance with some embodiments.

Referring now to FIG. 3, illustrated is a diagram 300 of mini-batch reuse in accordance with some embodiments. During the training stage, a plurality of training cases is presented to the neural network for training the neural network. The diagram 300 illustrates an example access pattern of the mini-batches at the GPU (e.g., GPU 206 of FIG. 2). In the example of FIG. 3, a training dataset (not shown) includes 100 mini-batches (e.g., MB1 through MB100). Each training case is then processed by the neural network, one mini-batch at a time. However, rather than serially processing the mini-batches sequentially from MB1 through MB100, the GPU 206 reuses prefetched mini-batches (e.g., mini-batches transferred from the CPU memory 212 to the GPU memory 216 such as discussed with respect to FIG. 2) based at least in part on a reuse distance and a reuse count.

As illustrated in FIG. 3, the GPU 206 trains a neural network by processing a first mini-batch (e.g., MB1 218). The GPU 206 does not discard MB1 218 after training; instead, the GPU 206 saves MB1 218 to GPU memory (e.g., GPU memory 216 of FIG. 2). Subsequently, the GPU 206 trains the neural network by processing a second mini-batch (e.g., MB2 220) and then a third mini-batch (e.g., MB3 222). The GPU 206 similarly saves MB2 220 and MB3 222 to GPU memory after training. After training the neural network using the third mini-batch, the GPU 206 does not proceed sequentially to training using a fourth mini-batch (e.g., MB4). Instead, the GPU 206 reuses the mini-batches already saved in GPU memory and starts training again with MB1 218, MB2 220, and MB3 222. In this manner, the GPU 206 is able to further train the neural network without requiring the CPU to transfer additional mini-batches, thereby reducing a volume of communications between the CPU/GPU and reducing pressure on the I/O bus (e.g., I/O bus 208 of FIG. 2).

In the embodiment of FIG. 3, the GPU 206 utilizes a reuse distance of 2. As used herein, the term "reuse distance" refers to a number of intervening mini-batches that the GPU 206 processes for training before re-using the same mini-batch again. For example, after processing MB1 218 for training, the GPU 206 process two different mini-batches (i.e., MB2 220 and MB3 222) before training again on MB1 218. Alternatively, in a slightly different context but representing the same concept, the reuse distance may be 3, representing a set of three mini-batches used for training before re-using the set of mini-batches (i.e., after how many mini-batches does the reuse occur). Additionally, the term "reuse count" refers to a number of instances that mini-batch reuse occurs. Those skilled in the art will recognize that the likelihood of overfitting increases along with increasing reuse count (i.e., the same mini-batch is reused multiple times). Conversely, increasing reuse distance decreases the probability of overfitting.

In another embodiment, rather than maintaining the same relative ordering of mini-batches when reusing for training, the mini-batches may be shuffled and reused in any order. For example, after training the neural network by processing MB1 218, then MB2 220, and then MB3 222, the GPU 206 then reuses the mini-batches by processing MB1 218, then MB3 222, and then MB2 220. However, this reordering changes the reuse distance between mini-batches. In particular, the reuse distance between MB3 222 decreases to 1 while the reuse distance for MB2 220 increases to 3 (as opposed to a reuse distance of 2 for all mini-batches as illustrated in FIG. 3).

Figure 4:
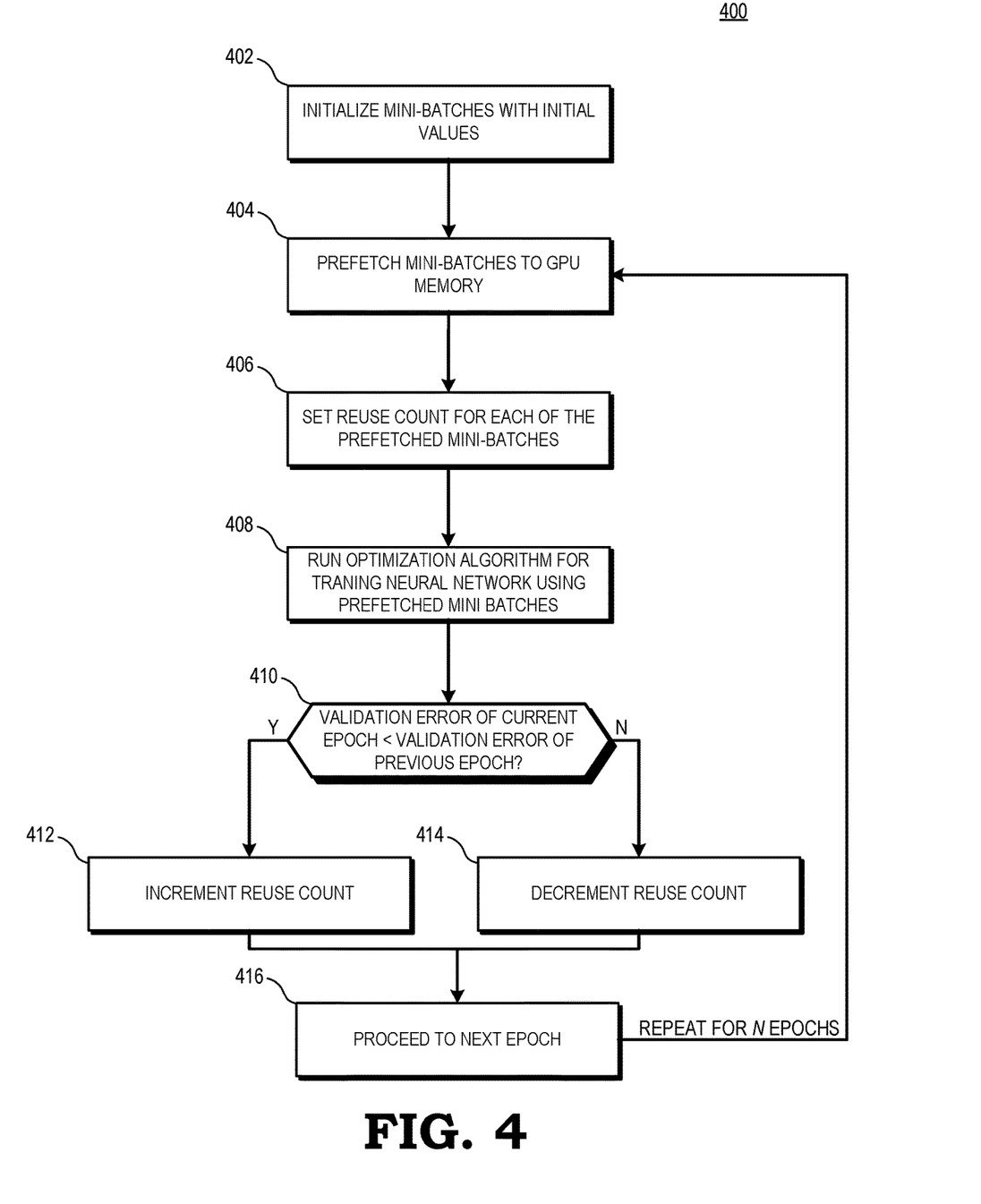
FIG. 4 is a block diagram illustrating a method of dynamically adjusting mini-batch reuse in accordance with some embodiments.

FIG. 4 is a block diagram illustrating a method 400 of dynamically adjusting mini-batch reuse in accordance with some embodiments. The method 400 may be implemented in various embodiments of processing systems, such as the heterogeneous CPU-GPU processing system 100 shown in FIG. 1 and the processing system 200 of FIG. 2.

At block 402, the method 400 begins with the GPU 206 initializing mini-batches with initial values. In one embodiment, the GPU 206 sets, for each mini-batch, a global use counter to be a number of epochs. One cycle through an entire training dataset is referred to as a training "epoch". An epoch is a single pass through a training dataset (i.e., one forward pass and one backward pass of all the examples/samples in the training set) and describes the number of times a machine learning/deep learning (ML/DL) algorithm sees the entire training set. Each time the ML/DL algorithm has seen all samples in the training dataset, an epoch has completed. Accordingly, the global use counter represents a number of times each mini-batch is used overall for the entire training dataset. Additionally, the GPU 206 sets, for each mini-batch, a maximum reuse counter to a predetermined value. In one example, the GPU 206 sets the maximum reuse counter to be 4. In various embodiments, the maximum reuse counter is statically defined (e.g., defined at the predetermined value of 4 as discussed above. In other embodiments, the maximum reuse counter dynamically increases (or decreases) in value in response to validation error (e.g., the maximum reuse count may continue increasing while validation error remains below a predetermined threshold).

At block 404, the GPU 206 prefetches mini-batches to GPU memory. In various embodiments, a number of mini-batches prefetched is determined based on the reuse distance. With respect to the mini-batches illustrated in FIGS. 2 and 3 (i.e., MB1, MB2, and MB3), the GPU 206 prefetches three mini-batches to GPU memory 216 based on a reuse distance of two.

At block 406, the GPU 206 sets a reuse count for each of the prefetched mini-batches. In one example, the GPU 206 sets the reuse count to be 1. That is, each of the prefetched mini-batches is reused for training once before being discarded. In contrast, the reuse count of mini-batches in conventional training processes is 0. In conventional training processes, after a mini-batch is processed for training the neural network, the mini-batch is discarded until every other mini-batch in processed.

At block 408, the GPU 206 runs an optimization algorithm for training the neural network using the prefetched mini-batches. In one embodiment, the GPU 206 runs a stochastic gradient descent (SGD) algorithm for a number of times equal to the number of mini-batches in an epoch (given the abbreviation NMB). Additionally, each time the GPU 206 trains the neural network by processing a mini-batch, the global use counter of the mini-batch is decremented. In this manner, no matter what order a mini-batch is processed, it will not be used to train the neural network more than epoch number of times during the overall training phase.

In one example, such as previously mentioned with respect to FIG. 3, a training dataset/epoch includes 100 mini-batches. With reference back to FIG. 3, the GPU 206 runs the SGD algorithm based on MB1 218, MB2 220, and MB3 222. Because the reuse count is set to 1 (from block 406), the GPU 206 runs the SGD algorithm again based on MB1 218, MB2 220, and MB3 222 before discarding the mini-batches and fetching new mini-batches for training the neural network. In this manner, the GPU 206 fetches three mini-batches at a time and reuses the fetched mini-batches once before discarding. Further, due to the mini-batch reuse, only 50 of the 100 mini-batches in the epoch will be fetched and processed (i.e., each of the prefetched mini-batches will be processed twice for training the neural network to equal NMB).

At block 410, the GPU 206 runs a validation set to determine whether the neural network model is overfitting. As opposed to the mini-batches of the training dataset used to adjust weights of the neural network, the validation set is a holdout set of data for the function to be learned but which is not directly used to train the neural network. That is, running the validation set does not adjust any weights of the neural network but instead verifies that any increase in accuracy over the training data set actually yields an increase in accuracy over a data set that has not been shown to the network before, or that the network has not yet trained on (i.e., validation data set). If validation error increases such that the accuracy over the training dataset increases, but the accuracy over the validation set stays the same or decreases, then overfitting may have occurred.

In machine learning/training, overfitting occurs when a statistical model describes random error or noise in a set of observations instead of the underlying relationship of the observations. A model that has been overfit will generally have poor predictive performance, as it can exaggerate minor fluctuations in the data. Overfitting sometimes occurs when a model begins to "memorize" training data rather than "learning" to generalize from trends in the data. As an example, if the number of parameters is the same as or greater than the number of observations, a model or learning process may be able to perfectly predict the training data simply by memorizing the training data in its entirety, but such a model will typically fail when making predictions about new or unseen data, since the model has not learned to generalize.

If validation error has decreased from one epoch to another, then the method 400 proceeds to block 412 where the reuse count is incremented. In one example, the GPU 206 increments the reuse count from 1 to 2. Accordingly, when training the neural network on the next epoch, each of the prefetched mini-batches is reused for training twice before being discarded. It should be noted that the operations of block 412 should not increase the reuse count to be larger than the maximum reuse counter of block 402 (i.e., a value of 4).

If validation error has increased from one epoch to the other, then the method 400 proceeds to block 414 where the reuse count reset to zero. Because validation error has increased, overfitting is likely, and therefore mini-batch reuse should be decreased until validation error starts to decrease again. In other embodiments, the reuse count is decremented at block 414 instead of resetting to zero. However, in general, block 414 decreases mini-batch reuse when training for the next epoch. Subsequently, both blocks 412 and 414 feed forward to block 416 to repeat method 400 for a user-defined number of epochs to complete neural network training.

In the manner described herein, the GPU 206 dynamically adapts mini-batch reuse by changing the reuse count in response to validation error. Increasing reuse count increases the probability of overfitting in general, while alleviating pressure on the I/O bus and reducing communications traffic between CPU and GPU. To avoid overfitting, the reuse count is reset to zero (or decremented) before adaptively increasing again. Additionally, in some embodiments, the GPU 206 also adjusts the reuse distance (e.g., changing the number of mini-batches processed for training the neural network before being reused). Generally, increasing reuse distance decreases the probability of overfitting. However, the reuse distance is often constrained as a function of how much capacity the GPU memory (e.g., GPU memory 216) has available for caching mini-batch data locally. Further, those skilled in the art will recognize that although described here in the context of adaptive mini-batch reuse at the GPU, the concepts described herein may also be applied in the case of CPUs, where the mini-batches may need to be fetched from SSD or deeper (possibly) slower memory.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   prefetching, from a central processing unit (CPU) to a processor of a processing system, a first plurality of mini-batches comprising a subset of a training dataset for a neural network;
   training, at the processor, the neural network for a current epoch by processing the first plurality of mini-batches;
   reusing the first plurality of mini-batches in training the neural network for the current epoch based on a reuse count value;
   identifying a validation error for the current epoch;
   modifying, based on a difference between the validation error for the current epoch and a validation error of a previous epoch, the reuse count value; and
   reusing the first plurality of mini-batches in training the neural network for a next epoch based on the modified reuse count value.

2. The method of claim 1, wherein training the neural network includes running an optimization algorithm using the first plurality of mini-batches.

3. The method of claim 1, further comprising:
   decrementing, at the processor, a global use counter associated with each mini-batch after processing each of the first plurality of mini-batches.

4. The method of claim 1, further comprising:
   reusing, without discard, the first plurality of mini-batches in training the neural network for the current epoch based on the reuse count value.

5. The method of claim 4, further comprising:
   running, at the processor, a validation set to identify a validation error for the current epoch.

6. The method of claim 5, wherein the modifying comprises:
   incrementing, based on the validation error for the current epoch being less than a validation error of a previous epoch, the reuse count value; and
   reusing, without discard, the first plurality of mini-batches in training the neural network for a next epoch based on the modified reuse count value.

7. The method of claim 5, wherein the modifying comprises:
   decrementing, based on the validation error for the current epoch being greater than a validation error of a previous epoch, the reuse count value; and
   reusing, without discard, the first plurality of mini-batches in training the neural network for a next epoch based on the modified reuse count value.

8. The method of claim 7, wherein decrementing the reuse count value comprises resetting the reuse count value to zero.

9. A non-transitory computer readable storage medium embodying a set of executable instructions, the set of executable instructions to manipulate at least one processor to:
   prefetch, from a central processing unit (CPU) to a processor of a processing system, a first plurality of mini-batches comprising a subset of a training dataset for a neural network;
   train, at the processor, the neural network for a current epoch by processing the first plurality of mini-batches;
   reuse the first plurality of mini-batches in training the neural network for the current epoch based on a reuse count value;
   identify a validation error for the current epoch;
   modify, based on a difference between the validation error for the current epoch and a validation error of a previous epoch, the reuse count value; and
   reuse the first plurality of mini-batches in training the neural network for a next epoch based on the modified reuse count value.

10. The non-transitory computer readable storage medium of claim 9, wherein the set of executable instructions is to manipulate at least one processor to decrement a global use counter associated with each mini-batch after processing each of the first plurality of mini-batches.

11. The non-transitory computer readable storage medium of claim 9, wherein the set of executable instructions is to manipulate at least one processor to reuse, without discard, the first plurality of mini-batches in training the neural network for the current epoch based on the reuse count value.

12. The non-transitory computer readable storage medium of claim 11, wherein the set of executable instructions is to manipulate at least one processor to run a validation set to identify a validation error for the current epoch.

13. The non-transitory computer readable storage medium of claim 12, wherein the set of executable instructions is to manipulate at least one processor to increment the reuse count value based on the validation error for the current epoch being less than a validation error of a previous epoch, and further to reuse without discard, the first plurality of mini-batches in training the neural network for a next epoch based on the incremented reuse count value.

14. The non-transitory computer readable storage medium of claim 12, wherein the set of executable instructions is to manipulate at least one processor to decrement the reuse count value based on the validation error for the current epoch being greater than a validation error of a previous epoch, and further to reuse without discard, the first plurality of mini-batches in training the neural network for the next epoch based on the modified reuse count value.

15. The non-transitory computer readable storage medium of claim 14, wherein the set of executable instructions is to manipulate at least one processor to reset, based on the validation error for the current epoch being greater than a validation error of a previous epoch, the reuse count value to zero.

16. A processing system comprising:
a central processing unit (CPU); and
a co-processor configured to:
prefetch, from the CPU, a first plurality of mini-batches comprising a subset of a training dataset for a neural network;
train the neural network for a current epoch by processing the first plurality of mini-batches;
reuse the first plurality of mini-batches in training the neural network for the current epoch based on a reuse count value;
identify a validation error for the current epoch;
modify, based on a difference between the validation error for the current epoch and a validation error of a previous epoch, the reuse count value; and
reuse the first plurality of mini-batches in training the neural network for a next epoch based on the modified reuse count value.

17. The system of claim 16, wherein the co-processor is configured to decrement a global use counter associated with each mini-batch after processing each of the first plurality of mini-batches.

18. The system of claim 16, wherein the co-processor is configured to reuse the first plurality of mini-batches in training the neural network for the current epoch without discard.

19. The system of claim 18, wherein the co-processor is configured to run a validation set to identify the validation error for the current epoch.

20. The system of claim 19, wherein the co-processor is configured to modify the reuse count value by incrementing the reuse count value based on the validation error for the current epoch being less than the validation error of the previous epoch, and further to reuse the first plurality of mini-batches in training the neural network for the next epoch without discard.

* * * * *